United States Patent
Luckhardt et al.

(10) Patent No.: US 12,255,751 B2
(45) Date of Patent: *Mar. 18, 2025

(54) METHOD FOR DATA COMMUNICATION WITH A DOMESTIC APPLIANCE BY A MOBILE COMPUTER DEVICE, MOBILE COMPUTER DEVICE AND DOMESTIC APPLIANCE

(71) Applicant: Electrolux Appliances Aktiebolag, Stockholm (SE)

(72) Inventors: Christoph Luckhardt, Rothenburg ob der Tauber (DE); Fabienne Reinhard-Herrscher, Rothenburg ob der Tauber (DE); Kersten Kaiser, Rothenburg ob der Tauber (DE); Christoph Walther, Rothenburg ob der Tauber (DE); Daniel Arler, Stockholm (SE); Sandro Comuzzi, Brussels (BE)

(73) Assignee: Electrolux Appliances Aktiebolag, Stockholm (SE)

( * ) Notice: Subject to any disclaimer, the term of this patent is extended or adjusted under 35 U.S.C. 154(b) by 83 days.

This patent is subject to a terminal disclaimer.

(21) Appl. No.: 17/722,306

(22) Filed: Apr. 16, 2022

(65) Prior Publication Data

US 2022/0239521 A1 Jul. 28, 2022

Related U.S. Application Data

(62) Division of application No. 15/328,551, filed on Jan. 24, 2017, now Pat. No. 11,722,330.

(51) Int. Cl.
*H04L 12/28* (2006.01)
*F24C 7/08* (2006.01)
(Continued)

(52) U.S. Cl.
CPC .......... *H04L 12/2807* (2013.01); *F24C 7/085* (2013.01); *F24C 7/087* (2013.01);
(Continued)

(58) Field of Classification Search
CPC .................................................. H04L 12/2807
See application file for complete search history.

(56) References Cited

U.S. PATENT DOCUMENTS

| 4,345,145 A | 8/1982 | Norwood |
| 2006/0024415 A1 | 2/2006 | Rado et al. |

(Continued)

FOREIGN PATENT DOCUMENTS

| DE | 4217749 A1 | 12/1993 |
| EP | 0563898 A2 | 10/1993 |

(Continued)

OTHER PUBLICATIONS

Extended European Search Report, EP22167921.0-1215, dated Jul. 13, 2022, Electrolux Appliances Aktiebolag.
(Continued)

*Primary Examiner* — Michael H Hong
(74) *Attorney, Agent, or Firm* — Chrisman Gallo Trochtrop

(57) ABSTRACT

A mobile device for communicating with a smart appliance is disclosed. The mobile device includes a sensing element for detecting a current value of an operational feature of the smart appliance. A memory including a database including a table of data of other values associated with operational features is included or accessible online. The mobile device includes a processor for accessing the database, comparing the relevant current and other values and, when they do not match, generate instructions to the smart appliance to adjust its settings so as to bring the current and other values into alignment. The mobile device is configured to communicate (Continued)

with the smart appliance in a first state wherein data flows from the smart appliance to the mobile device only; and in a second state wherein the data flows in both directions.

16 Claims, 7 Drawing Sheets

(51) Int. Cl.
*F24C 15/02* (2006.01)
*G05B 19/042* (2006.01)
*G08C 17/02* (2006.01)
*H04L 12/64* (2006.01)
*H04L 65/612* (2022.01)
*H04L 65/75* (2022.01)
*H04N 7/18* (2006.01)
*H04N 23/63* (2023.01)
*H04Q 9/00* (2006.01)
*H04W 76/10* (2018.01)
*G06F 16/24* (2019.01)
*G06F 16/903* (2019.01)
*H04W 52/02* (2009.01)
*H04W 84/12* (2009.01)

(52) U.S. Cl.
CPC .......... *F24C 15/023* (2013.01); *F24C 15/024* (2013.01); *G05B 19/042* (2013.01); *G08C 17/02* (2013.01); *H04L 12/2803* (2013.01); *H04L 12/2816* (2013.01); *H04L 12/282* (2013.01); *H04L 12/2834* (2013.01); *H04L 12/6418* (2013.01); *H04L 65/612* (2022.05); *H04L 65/762* (2022.05); *H04N 7/183* (2013.01); *H04N 23/63* (2023.01); *H04Q 9/00* (2013.01); *H04W 76/10* (2018.02); *G05B 2219/2613* (2013.01); *G05B 2219/2628* (2013.01); *G05B 2219/2643* (2013.01); *G06F 16/24* (2019.01); *G06F 16/90335* (2019.01); *G08C 2201/93* (2013.01); *H04L 2012/2841* (2013.01); *H04L 2012/285* (2013.01); *H04M 2250/22* (2013.01); *H04Q 2209/40* (2013.01); *H04Q 2209/43* (2013.01); *H04Q 2209/80* (2013.01); *H04Q 2209/84* (2013.01); *H04W 52/0235* (2013.01); *H04W 84/12* (2013.01); *Y02D 30/70* (2020.08)

(56) References Cited

U.S. PATENT DOCUMENTS

| 2007/0158335 | A1 | 7/2007 | Mansbery |
| 2013/0232451 | A1 | 9/2013 | Chen et al. |
| 2013/0265159 | A1* | 10/2013 | Durian .................... F24C 7/082 340/12.5 |
| 2015/0350612 | A1 | 12/2015 | Brunson et al. |
| 2021/0117717 | A1* | 4/2021 | Ha .......................... G06N 20/00 |

FOREIGN PATENT DOCUMENTS

| EP | 2706704 A1 | 3/2014 |
| WO | WO2013/096136 A1 | 6/2013 |

OTHER PUBLICATIONS

Extended European Search Report, EP22167927.7-1215, dated Jul. 15, 2022, Electrolux Appliances Aktiebolag.
Extended European Search Report, EP22167938.4-1215, dated Jul. 13, 2022, Electrolux Appliances Aktiebolag.
English Language Machine Translation of DE4217749A1.

* cited by examiner

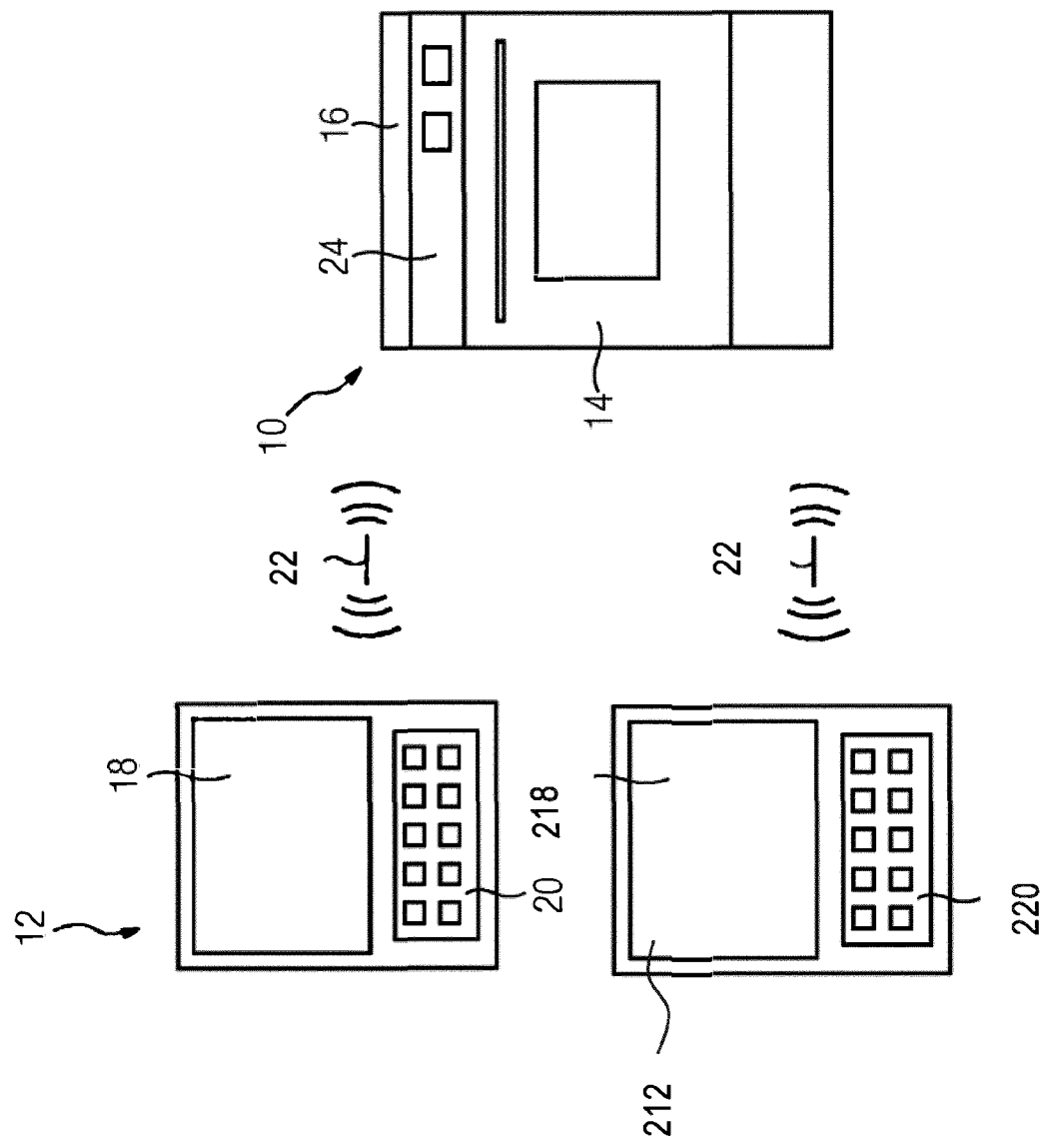

METHOD FOR DATA COMMUNICATION WITH A DOMESTIC APPLIANCE BY A MOBILE COMPUTER DEVICE, MOBILE COMPUTER DEVICE AND DOMESTIC APPLIANCE

CROSS REFERENCE TO RELATED APPLICATIONS

This application is a Divisional of U.S. patent application Ser. No. 15/328,551, filed on Jul. 27, 2017, which is a national phase application of PCT/EP2015/069597, filed Aug. 27, 2015, which further claims priority to European patent application 14183303.8, filed Sep. 3, 2014, the content of all of the aforementioned patent applications being herein incorporated by reference.

BACKGROUND OF THE INVENTION

Field of the Invention

The present invention relates to a method for data communication with a domestic appliance by a computer device. Further, the present invention relates to application software for a computer device connected or connectable to a domestic appliance, in particular a cooking appliance including a cooking oven and/or a cooking hob. Moreover, the present invention relates to a domestic appliance, in particular a cooking appliance including a cooking oven with an oven cavity and/or a cooking hob, connected or connectable to a computer device. Additionally, the present invention relates to a computer device connected or connectable to a domestic appliance, in particular a cooking appliance including a cooking oven and/or a cooking hob.

DESCRIPTION OF RELATED ART

Modern domestic appliances can be connectable to a communication network and/or to a computer device. Said communication network may be the internet or an internal network. These connections of the domestic appliances allow additional options for operating the domestic appliance. For example, the t domestic appliances may be controlled by the computer device and/or via the communication network. Additional information provided by the communication network may be used for operating the domestic appliance. In many cases, information from the communication network is up to date.

For the data communication, it can be advantageous or even necessary, that the usability is flexible and/or effectively, so that it can be operated and/or controlled from different locations, for example.

BRIEF SUMMARY OF THE INVENTION

It is an object of the present invention to provide an improved method for data communication with a domestic appliance by a computer device. Especially, it is an object of the present invention to improve the features and/or the usability and/or the effectivity of the data communication.

The present invention relates to a method for data communication with a domestic cooking appliance by a mobile computer device, wherein the domestic cooking appliance and the mobile computer device are interconnected or interconnectable via a wireless data connection that is adapted for transferring signals between the domestic cooking appliance and the mobile computer device.

The wireless data connection that is adapted for transferring signals between the domestic cooking appliance and a mobile computer device allows a very flexible and effective use of the data communication with the domestic appliance by a mobile computer device. When the domestic appliance is a cooking appliance, for example a cooking oven with an oven cavity and/or a cooking hob, it is very helpful if it is possible to control the domestic appliance by a wireless data connection which can be operated near the domestic appliance by the mobile computer device. For example, the mobile computer device may be a mobile phone, a smart phone, a tablet personal computer, a netbook or a notebook.

In some preferred embodiments, the mobile computer device can be switched into a first connection state with the domestic appliance. In the first connection state, wireless data connection is enabled by the domestic appliance and the mobile computer device.

In the first connection state, remote control and/or monitoring can preferably be enabled by the domestic appliance and the mobile computer device, so that in the first connection state parameters and/or functions of the domestic appliance, especially oven functions, can be monitored and/or controlled on the mobile computer device.

Preferably, the mobile computer device can be switched into a second connection state with the domestic appliance. In the second connection state no parameters and/or functions of the domestic appliance, especially no oven functions, can be monitored and/or controlled.

In the second connection state, remote control can preferably be disabled by the domestic appliance and/or the mobile computer device.

According to some embodiments, in the second connection state, the wireless data connection, especially the WiFi connection, is disabled by the domestic appliance and/or the mobile computer device.

In some preferred embodiments, the mobile computer device is interconnected or interconnectable via a wireless data connection with a first domestic appliance and a second domestic appliance.

Preferably, the first domestic appliance and the second domestic appliance are of the same appliance category or of different appliance categories. The appliance categories can preferably include ovens, cooktops and washing machines.

In some preferred embodiments, the first domestic appliance and the second domestic appliance are ovens.

Preferably, the mobile computer device is in a first appliance connection mode in the first connection state only with the first domestic appliance. In some embodiments, the mobile computer device is in the first appliance connection mode in the second connection state with the second domestic appliance.

As a further option, the mobile computer device is in a second appliance connection mode in the first connection state only with the second domestic appliance. In some preferred embodiments, the mobile computer device is in the second appliance connection mode in the second connection state with the first domestic appliance.

Preferably, the mobile computer device is switchable between the first appliance connection mode and the second appliance connection mode.

Optionally, when the mobile computer device switches between appliance connection modes, it is getting configuration data from the domestic appliance, which is switched into the first connection state, wherein the configuration data is saved in the memory unit of the mobile computer device.

In a further embodiment, a first mobile computer device and a second mobile computer device are interconnected or interconnectable via a wireless data connection with the domestic appliance.

Preferably, in a first device connection mode only the first mobile computer device is in the first connection state with the domestic appliance. Optionally, in the first device connection mode the second mobile computer device is in the second connection state with the domestic appliance.

In a second device connection mode, the first mobile computer device is, in some embodiments, in the second connection state with the domestic appliance. As a preferred option, in the second device connection mode only the second mobile computer device is in the first connection state with the domestic appliance.

In some embodiments, the domestic appliance is switchable between first device connection mode and the second device connection mode.

Further embodiments comprise a mobile computer device with a display presenting a display area, wherein the display area is splitted into rectangular display regions, especially into rectangular app tiles.

Preferably, each display region comprises a container for displaying data. The mobile computer device can, in some embodiments, receive configuration data from the domestic appliance.

The size and the position of the display regions as well as the data to be displayed in the containers can especially be adapted based on the configuration data.

Some further embodiments allow the configuration data to be determined by the domestic appliance and/or the behaviour of the user of the domestic appliance.

Preferably, the method comprises the steps of:
- detecting visually at least one object being treated by the domestic appliance,
- generating a picture signal of the object being treated by the domestic appliance,
- transferring the picture signal from the domestic appliance to the mobile computer device via the wireless connection, and
- displaying a picture of the object being treated by the domestic appliance on a display or touch screen of the mobile computer device on the basis of the picture signal.

Therefore, the object being treated by the domestic appliance can especially represented or representable in real-time on the display or touch screen of the mobile computer device.

The wireless data connection between the domestic appliance and the mobile computer device can provide a representation of the object in real-time. The real-time representation of the object being treated by the domestic appliance on the display of the mobile computer device provides information about the actual state of said object from a distance.

According to a preferred embodiment, the domestic appliance is a cooking appliance including a cooking oven and/or a cooking hob, said object being treated by the domestic appliance is a food stuff being treated by the cooking appliance, in particular a food stuff being treated in an oven cavity of a cooking oven, and said wireless data connection is a data connection for transferring signals from the cooking appliance to the mobile computer device for allowing monitoring in real time by a user of the visual appearance of said food stuff being treated by the cooking appliance on the display or touch-screen of said mobile computer device.

Preferably, at least one current operating parameter of the domestic appliance is transferred between the domestic appliance and the mobile computer device via the wireless data connection, in particular wherein said at least one current operating parameter of the domestic appliance is indicated by the display or touch screen of the mobile computer device and/or wherein said at least one current operating parameter of the domestic appliance can be set by a user via said display or touch screen of the mobile computer device. The indication of current operating parameters increases the user's level of information.

In particular, the at least one current operating parameter of the domestic appliance is represented by a numerical value and/or by one or more graphical symbols on the display or touch screen of the mobile computer device. For example, the graphical symbols may represent numerical values by different sizes of an area or by the characteristic colours.

According to one embodiment, the domestic appliance is a cooking appliance, wherein the temperature of at least one food stuff being treated by the cooking appliance is detected by said cooking appliance, at least one corresponding temperature signal is transferred to the mobile computer device via the wireless data connection in real-time, and at least one corresponding temperature value is indicated by the mobile computer device. The view of the food stuff and the knowledge of the temperature provide broad information of the cooking process.

Further, the domestic appliance is a cooking appliance, wherein an elapsed cooking time and/or a remaining cooking time of at least one food stuff being treated by the cooking appliance is transferred to the mobile computer device via the wireless data connection in real-time and indicated by the mobile computer device.

Additionally, the at least one operating parameter of the domestic appliance, preferably at least one current parameter of the domestic appliance, is evaluated by the mobile computer device and the obtained result is indicated on the display or touch screen of the mobile computer device, wherein said result includes a history and/or a statistical analysis of said at least one operating parameter of the domestic appliance and/or further corresponding information relating to said history and/or statistical analysis.

Optionally, the mobile computer device is connected or connectable to the internet via a wireless data connection, in particular via a wireless data local area network ("WLAN") and/or a mobile communications network, wherein the mobile computer device is connected or connectable to at least one social network and/or to at least one data base. The connection of the domestic appliance to the internet allows additional options for operating said domestic appliance.

The wireless data connection between the domestic appliance and the mobile computer device is a bidirectional connection transferring signals between the domestic appliance and the mobile computer device, wherein the domestic appliance is controlled or controllable by the user via the mobile computer device. The wireless bidirectional connection between the domestic appliance and the mobile computer device allows a remote control of said domestic appliance.

The present invention relates further to application software for a mobile computer device connected or connectable to a domestic cooking appliance including a cooking oven and/or a cooking hob, wherein the application software is provided for performing the method mentioned above. The use of application software allows a plurality of additional features by low complexity.

According to the invention, the application software provides a recipe generator for the cooking appliance, wherein a user inputs or selects a first and a second search criteria for a cooking recipe and the recipe generator provides at least one corresponding proposal for a cooking recipe, and wherein a plurality of cooking recipes is stored in a memory of the mobile computer device and/or in a data base of the internet.

Said first and second search criteria for a cooking recipe are selectable by the user from a group comprising at least one recipe food ingredient type, at least one recipe food ingredient amount, at least one cooking or baking temperature, at least one cooking or baking duration and/or at least one generic cooking mode such as radiation cooking, forced convection cooking, steam cooking, microwave cooking or induction cooking, and the application software comprises at least one algorithm for selecting said at least one corresponding proposal for a cooking recipe from said plurality of stored recipes on the basis of said selection by the user of at least one of said search criteria for a cooking recipe.

Moreover, the application software comprises an algorithm for adapting at least one recipe parameter of at least one of said plurality stored cooking recipes to an operational feature of the cooking appliance.

In this case, said recipe parameter is at least one of said recipe food ingredient amount, cooking or baking temperature, cooking or baking duration, and/or generic cooking mode and/or wherein said operational feature of the cooking appliance is a volume of an oven cavity of the cooking appliance, a calorific output of at least one heating element of the cooking appliance and/or a calorific output of a cooking mode of the cooking appliance such as a mode of the cooking appliance for radiation cooking, for forced convection cooking, for steam cooking, for microwave cooking or for induction cooking.

Further, the application software comprises an algorithm for adapting at least one operational parameter of the cooking appliance according to said at least one recipe parameter of the cooking recipe that has been selected by the user from said proposal by said recipe generator for a cooking recipe, wherein said at least one operational parameter of the cooking appliance is a cooking or baking temperature, a cooking or baking duration and/or a mode of the cooking appliance for radiation cooking, for forced convection cooking, for steam cooking, for microwave cooking or for induction cooking.

According to another example, the application software provides a multi-timer function for two or more dishes and/or courses in or on the cooking appliance, wherein said dishes and/or courses can be treated together at the same temperature by the cooking appliance, in particular together in the same oven cavity at the same temperature, but can require different cooking durations, and wherein the elapsed and/or remaining cooking durations of individual dishes and/or courses are indicated by the display or touch screen of the mobile computer device.

According to a further example, the application software provides a cooking time reduction function and/or a cooking temperature reduction function, wherein a user may reduce the cooking time and/or the cooking temperature of the cooking appliance by the mobile computer device via the wireless bidirectional data connection between the domestic appliance and the mobile computer device. In this case, the user can reduce the cooking time and/or the cooking temperature, but not increase said cooking time and/or the cooking temperature, respectively. This contributes to the safety of the cooking process.

Further, the present invention relates to a domestic appliance, in particular a cooking appliance including a cooking oven with an oven cavity and/or a cooking hob, connected or connectable to a mobile computer device via a wireless connection, wherein the domestic appliance is provided for the aforesaid method.

The domestic appliance comprises preferably at least one camera, in particular a camera arranged to detect visually and to provide a picture signal of said food stuff being treated by said cooking appliance in said oven cavity or on said coking hob.

Moreover, the present invention relates to a mobile computer device connected or connectable to a domestic appliance, in particular a cooking appliance including a cooking oven and/or a cooking hob, via a wireless data connection, wherein the mobile computer device comprises at least one display and/or touch screen, wherein the mobile computer device is provided for the method mentioned above and/or the mobile computer device supports aforesaid application software.

At last, the present invention relates to a computer program stored in a computer usable medium, comprising computer readable program means for causing a computer to perform the method mentioned above, wherein the computer program includes aforesaid application software.

Novel and inventive features of the present invention are set forth in the appended claims.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The present invention will be described in further detail with reference to the drawings, in which FIG. 7 illustrates a schematic view of an example for a domestic appliance and two mobile computer devices according to a preferred embodiment of the present invention.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
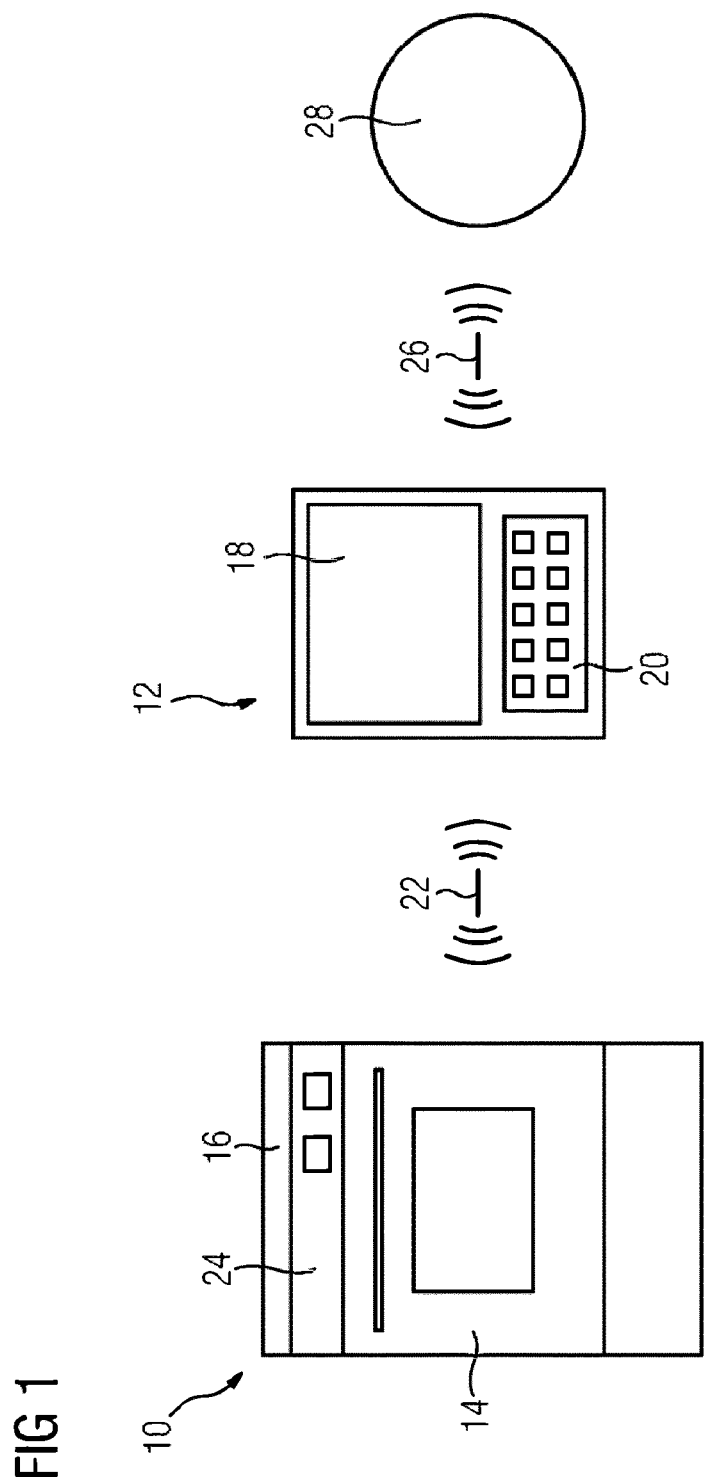
FIG. 1 illustrates a schematic view of a domestic appliance and a mobile computer device according to a preferred embodiment of the present invention.

FIG. 1 illustrates a schematic view of a domestic appliance 10 and a mobile computer device 12 according to a preferred embodiment of the present invention. In this example, the domestic appliance is a cooking appliance 10 including a cooking oven 14 and a cooking hob 16, wherein the cooking hob 16 is arranged above the cooking oven 14. Alternatively, the cooking appliance 10 may only include either the cooking oven 14 or the cooking hob 16. In this example, the domestic appliance 10 or the cooking appliance 10, respectively, includes a stationary control unit 24. In general, the domestic appliance 10 may be an arbitrary appliance, which is monitored and/or controlled by the user via the mobile computer device 12.

Further, the cooking device 10 can comprise one or more cameras not shown in FIG. 1. For example, the camera is arranged in or in front of an oven cavity of the cooking oven 14, so that food stuff inside the oven cavity may be monitored by the user. Further, the camera may be arranged above the cooking hob 16, so that food stuff on said cooking hob 16 may be monitored by the user. In the latter case, the camera may be attached at an exhaust hood arranged above the cooking hob 16.

Moreover, the cooking device 10 may comprise at least one temperature sensor for detecting the temperature of the food stuff and/or in the oven cavity and/or in a cooking pot.

The mobile computer device 12 includes a display 18 or a touch screen 18. Further, the mobile computer device 12 includes a keyboard 20. The display 18 forms an output unit of the mobile computer device 12. The keyboard 20 forms an input unit of the mobile computer device 12. The touch screen 18 forms an input/output unit of the mobile computer device 12. If the display 18 is formed as the touch screen 18, then the mobile computer device 12 does not need necessarily the keyboard 20.

The mobile computer device 12 may be a customary device. For example, the mobile computer device 12 may be a mobile phone, a smart phone, a tablet personal computer, a netbook or a notebook.

There is a wireless data connection 22 between the cooking appliance 10 and the mobile computer device 12. According to one embodiment not being part of the invention, said wireless data connection 22 is unidirectional, wherein signals may be transferred only from the domestic appliance 10 to the mobile computer device 12. In this case, the user is able to monitor a working process of the cooking appliance 10 by the mobile computer device 12. If the wireless data connection 22 is bidirectional, wherein signals may be transferred from the domestic appliance 10 to the mobile computer device 12 as well as from the mobile computer device 12 to the domestic appliance 10. In the latter case, the user is able to control the working process of the cooking appliance 10 by the mobile computer device 12. If the wireless data connection 22 between the cooking appliance 10 and the mobile computer device 12 is unidirectional, then the user may control the domestic appliance 10 by the stationary control unit 24 of the domestic appliance 10. If the wireless data connection 22 between the cooking appliance 10 and the mobile computer device 12 is bidirectional, then the user may control the domestic appliance 10 by the mobile computer device 12 and/or the stationary control unit 24.

The cooking appliance 10 and the mobile computer device 12 may be interconnected or interconnectable via the internet. For example, the cooking appliance 10 is connected or connectable to the internet via a local area network (LAN) or a wireless local area network (WLAN) to the internet. The mobile computer device 12 may be connected or connectable to the internet via a wireless local area network (WLAN) or a mobile communications network.

Alternatively, the wireless data connection 22 between the cooking appliance 10 and the mobile computer device 12 may be realized via a radio contact. Further, the cooking appliance 10 and the mobile computer device 12 may be interconnected or interconnectable via infrared signals. In general, an arbitrary wireless data connection 22 between the cooking appliance 10 and the mobile computer device 12 is possible. Preferably, the selection of the type of the wireless data connection 22 between the cooking appliance 10 and the mobile computer device 12 depends on the favoured operating distance.

The display 18 and/or the touch screen 18 of the mobile computer device 12 are provided for indicating current pictures recorded by the camera of the cooking device 10. The wireless data connection 22 from the cooking appliance 10 to the mobile computer device 12 is provided for transferring picture signals in real time.

In a similar way, the display 18 and/or the touch screen 18 of the mobile computer device 12 are provided for indicating current temperature values detected by the temperature sensor of the cooking device 10. The wireless data connection 22 from the cooking appliance 10 to the mobile computer device 12 is provided for transferring temperature signals in real time.

Optionally, there is an external connection 26 between the mobile computer device 12 and the Internet 28. Preferably, the mobile computer device 12 is connected to the Internet 28 via the wireless local area network (WLAN) or the mobile communications network. The external connection 26 allows communications between the mobile computer device 12 and the Internet 28. For example, the mobile computer device 12 may use applications provided by the Internet 28. Further, the user is able to download software for the mobile computer device 12 from the Internet 28. Moreover, the user can access data bases in the Internet 28 by the mobile computer device 12.

All in all there are four possible different constellations in view of the wireless data connection 22 and the external connection 26. According to a first constellation the wireless data connection 22 is unidirectional from the cooking appliance 10 to the mobile computer device 12, wherein the external connection 26 lacks. According to a second constellation the wireless data connection 22 is bidirectional between the cooking appliance 10 and the mobile computer device 12, wherein the external connection 26 lacks. According to a third constellation the wireless data connection 22 is unidirectional from the cooking appliance 10 to the mobile computer device 12, wherein the external connection 26 exists between the mobile computer device 12 and the Internet 28. According to a fourth constellation the wireless data connection 22 is bidirectional between the cooking appliance 10 and the mobile computer device 12, wherein the external connection 26 exists between the mobile computer device 12 and the Internet 28. In the first and second constellations the wireless data connection 22 between the cooking appliance 10 and the mobile computer device 12 may be realized via the internet, although the external connection 26 between the mobile computer device 12 and the Internet 28 lacks.

Figure 2:
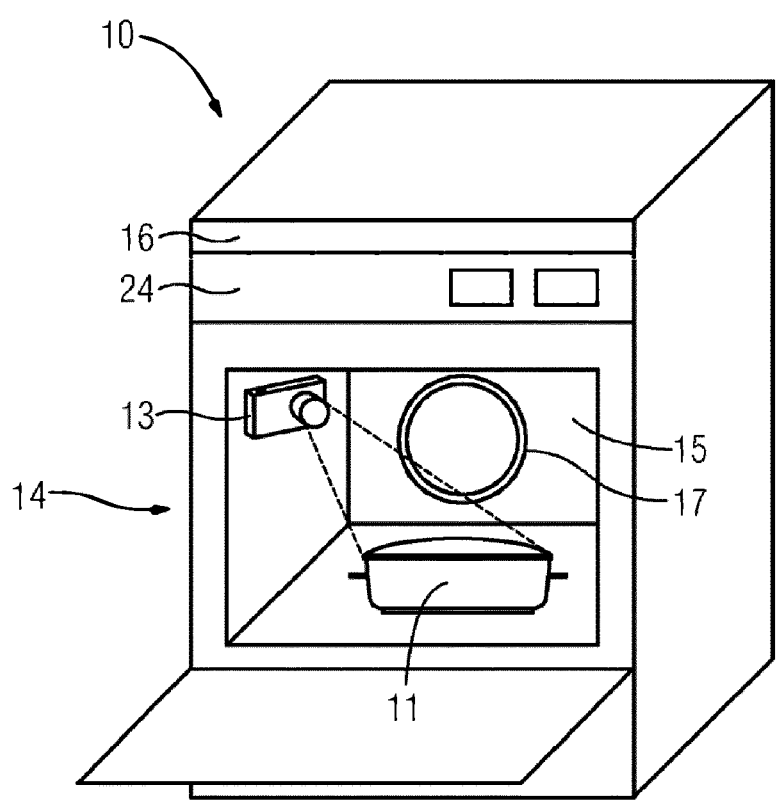
FIG. 2 illustrates a schematic perspective view of the domestic appliance according to the preferred embodiment of the present invention.

FIG. 2 illustrates a schematic perspective view of the domestic appliance 10 according to the preferred embodiment of the present invention, wherein the domestic appliance is the cooking appliance 10. Said cooking appliance 10 includes the cooking oven 14 with an oven cavity 15 and the cooking hob 16, wherein the cooking hob 16 is arranged above the cooking oven 14.

Food stuff 11 being treated by the cooking appliance 10 is arranged inside the oven cavity 15. A heating element 17 is arranged at a rear wall of the oven cavity 15. The cooking appliance 10 comprises a camera 13. Said camera 13 is provided for detecting visually the food stuff 11 being treated by the cooking appliance 10. The camera 13 provides a picture signal of said food stuff 11. The camera 13 may be arranged in or in front of the oven cavity 15 of the cooking oven 14, so that the food stuff 11 inside the oven cavity 15 may be monitored by the user. Alternatively, the camera 13 may be arranged above the cooking hob 16, so that food stuff 11 on said cooking hob 16 may be monitored by the user. In the latter case, the camera 13 may be attached at an exhaust hood arranged above the cooking hob 16.

The present invention provides application software ("APP") for the mobile computer device 12. Said application software comprises one or more functions and/or features supporting the operations of the mobile computer device 12. Several functions and features of the application software are described below.

Figure 3:
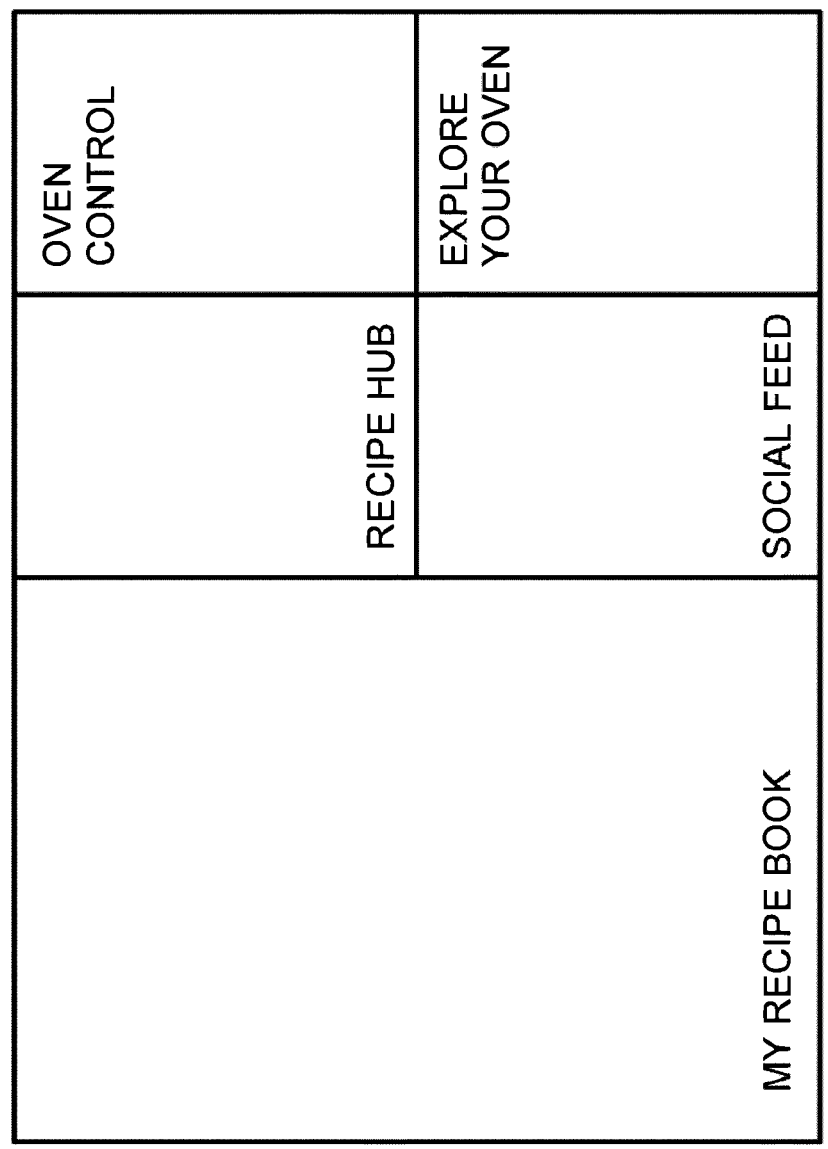
FIG. 3 illustrates a schematic view of an example for a main page of application software ("APP") for the mobile computer device according to the preferred embodiment of the present invention.

FIG. 3 illustrates a schematic view of an example for a main page 30 of application software ("APP") for the mobile computer device according to the preferred embodiment of the present invention. Said main page 30 may be indicated by the display 18 or touch screen 18. In this example, the area of the main page 30 is subdivided into five subareas. The area of the main page 30 represents a menu, while the five subareas represent a menu item in each case. In this embodiment, the menu items correspond with the functions "my recipe book", "recipe hub", "social feed", "oven control" and "explore your oven".

The function "my recipe book" allows the generation and administration of an individual recipe book by the user. Said individual recipe book may be generated on the basis of a recipe book provided by the manufacturer of the cooking appliance 10, mobile computer device 12 and/or application software. Recipes generated by the user may be inserted into the function "my recipe book".

The function "recipe hub" allows the selection of recipes from a data base. The user may input a number of criteria for the desired recipe. The function "social feed" allows the access to a social network, cooking sites and/or cooking blogs. The function "explore your oven" allows an access to manuals in order to obtain satisfactory results.

The function "oven control" allows an adjusting of cooking parameters for the cooking appliance 10 by the mobile computer device 12. The function "oven control" requires the bidirectional wireless connection 22 between the cooking appliance 10 and the mobile computer device 12.

According to one embodiment, the application software ("APP") comprises a viewing function. Said viewing function allows the representation of a picture signal from the camera 13 of the cooking appliance 10 on the display 18 or touch screen 18 of the mobile computer device 12. The viewing function allows a current viewing of the food stuff 11 in the oven cavity 15 of the cooking oven 14 and/or on the cooking hob 16 on the display 18 or touch screen 18 of the mobile computer device 12. A real-time transmission of pictures from the camera 13 of the cooking appliance 10 to the display of the mobile computer device 12 is possible. Thus, the user is able to monitor the food stuff 11 in the oven cavity 15 of the cooking oven 14 and/or on the cooking hob 16 of the cooking appliance 10 from a distance by the mobile computer device 12. The user is always able to inform about the current state of the food stuff 11 in or on the cooking appliance 10.

If the wireless connection 22 between the cooking appliance 10 and the mobile computer device 12 is unidirectional, wherein the picture signals are transferred from the domestic appliance 10 to the mobile computer device 12, then the user is able to monitor the cooking process of the cooking appliance 10 by watching the picture or pictures of the food stuff 11 on the display 18 or touch screen 18 of the mobile computer device 12. In this case, the user can control the cooking process by the stationary control unit 24 of the cooking appliance 10. The unidirectional wireless connection 22 between the cooking appliance 10 and the mobile computer device 12 has the advantage that the cooking process of the cooking appliance 10 cannot be disturbed by external signals.

If the wireless connection 22 between the cooking appliance 10 and the mobile computer device 12 is bidirectional, wherein the picture signals are transferred from the domestic appliance 10 to the mobile computer device 12 and control signals are transferred from the mobile computer device 12 to the domestic appliance 10, then the user is able to control the working process of the cooking appliance 10 by handling the mobile computer device 12. The bidirectional wireless connection 22 between the cooking appliance 10 and the mobile computer device 12 has the advantage that the user can control the cooking process of the cooking appliance 10 from a relative big distance.

According to another embodiment, the application software ("APP") comprises a recipe generator. The recipe generator generates a proposal for one or more recipes. After the user has input or selected one or more search criteria for the favoured cooking recipe, then the recipe generator provides one or more corresponding proposals for at least one cooking recipe from a data base. Said data base may be stored in a memory of the mobile computer device 12 or provided by the internet.

For example, the recipe generator provided by the application software ("APP") comprises the following steps. In a first step the user inputs directly an ingredient of the favoured recipe. For example, the user selects a kind of meat, e.g. "beef", "pork", "duck" or "chicken", from a menu "meat" or kind of vegetable from a menu "vegetables". Further examples selectable by the user are "casserole", "soup", "dessert", "bread", "cake" and/or "cookies".

Figure 4:
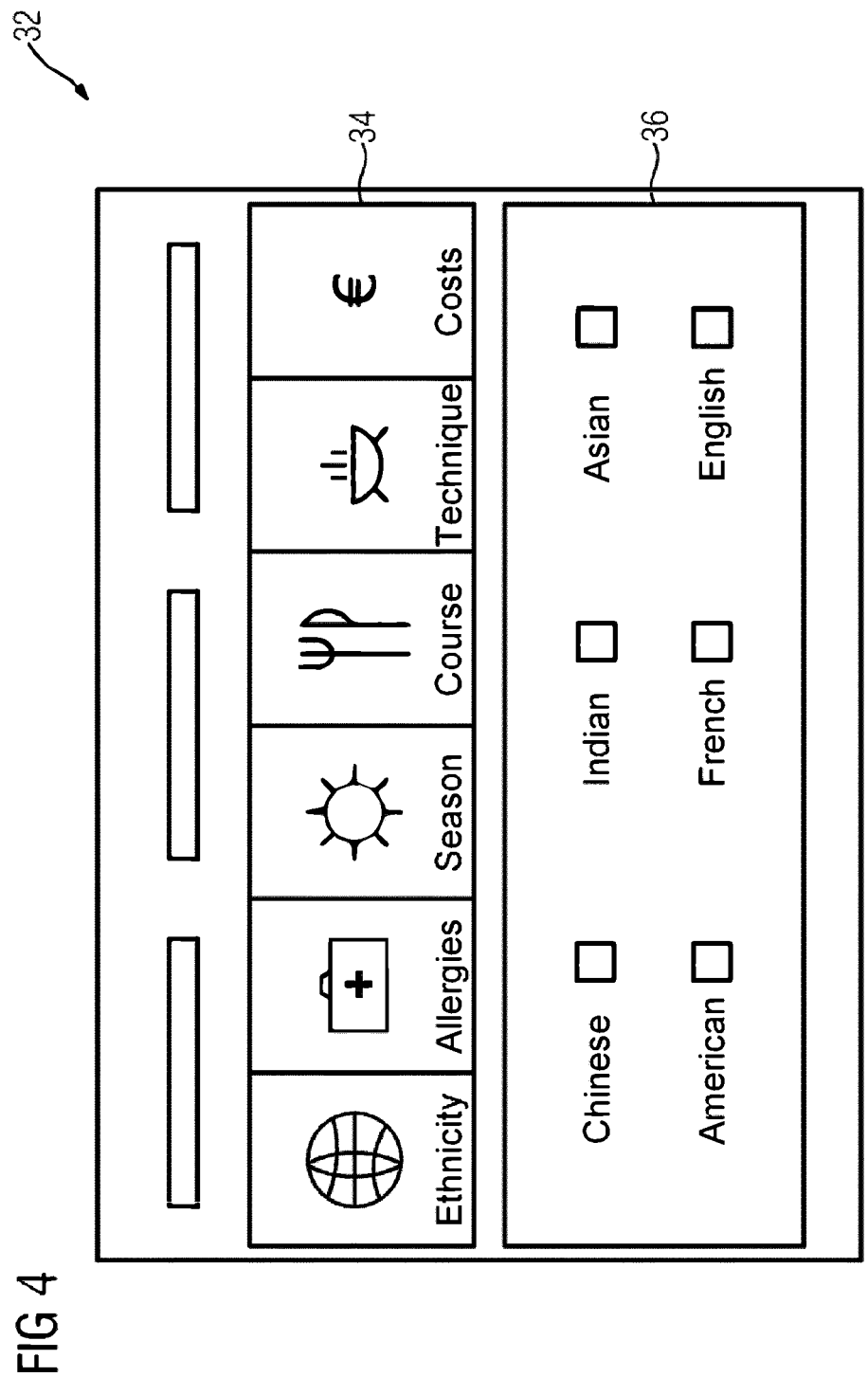
FIG. 4 illustrates a schematic view of an example for a page of a recipe generator of the application software ("APP") for the mobile computer device according to the preferred embodiment of the present invention.

In a second step the user may select further search criteria by menu items. FIG. 4 illustrates a schematic view of an example for a page 32 of the recipe generator of the application software ("APP") for the mobile computer device 12 according to the preferred embodiment of the present invention. Said page 32 comprises an upper menu 34 and a lower menu 36.

In this example, the upper menu 34 comprises the menu items "ethnicity", "allergies", "season", "course", "technique" and "costs". The menu items of the lower menu 36 depend on the selection in the upper menu 34. If the user has selected the menu item "ethnicity" in the upper menu 34 for example, then the user can further select between the menu items "American", "Chinese", "French", "Indian", "Asian", "English" and they like in the lower menu 36. The selection of the menu item "allergies" may provide a table of typical food allergies. The selection of the menu item "season" may relate to culinary seasons. The selection of the menu item "course" allows the selection of the number of courses of the menu. The selection of the menu item "technique" provides a selection of the technical method of the cooking process, e.g., top heat, bottom heat, top and bottom heat, circulating air, full steam, half steam plus heat, quarter steam plus heat, grill and/or low temperature cooking.

In a next step, the recipes found by the application software are indicated on the display 18 or touch screen 18 of the mobile computer device 12, so that the user may select one of the found recipes. The parameters of the corresponding cooking process are adjusted automatically. At last, the user may activate a start function of the cooking process by operating the keyboard 20 or touch screen 18.

Additionally, the application software ("APP") allows food pairing, wherein the main ingredients and/or main aromas of a dish are determined and groups of main ingredients and/or main aromas harmonizing with each other are defined. Said food pairing comprises the following steps.

After selecting a first dish and the function "food pairing" by the user, predefined further dishes are proposed by the application software ("APP"), wherein said further dishes harmonize with the first dish in view of the ingredients and/or aromas. Optionally, the user may restrict the further dishes by selecting "next course", "prior course", "side dish" or "main dish".

Furthermore, the function "food pairing" may be supported by a database comprising appropriately configured and arranged tables of data including dishes and/or courses, wherein the main ingredients and/or main aromas of said dishes and/or courses harmonize with each other.

According to a further embodiment, the application software ("APP") comprises a function "shopping list". The function "shopping list" may be activated by the user and generates a list of ingredients required for the selected dish or dishes. The generated shopping list may be edited by the user. For example, the shopping list may by printed in hardcopy form and/or used for an online order.

According to another embodiment, the application software ("APP") comprises a recipe converter. Said recipe converter allows an automatic conversion and indication of the cooking time and/or the temperature from one heating method to another, for example from a conventional heating method, e.g. top and bottom heat or circulating air, to a steam heating method.

Further, the application software ("APP") may comprise a recipe recognition function. Said recipe recognition function allows the identification of signs, i.e., numbers and/or letters, in recipe data bases of different origins. For example, the recipe recognition function is able to recognize signs in a text file, e.g., PDF file, made of scanned-in hand-written documents. The recipe recognition function is provided for recognizing the ingredients, their amounts, the cooking time, the cooking temperature and/or the way of heating. Further, the recipe recognition function may provide proposals for alternative ways of heating. Optionally, the cooking parameters are converted for the alternative way of heating.

In particular, the application software ("APP") may comprise a communication basis for one or more social networks. For example, the communication basis is provided for exchanging experiences and information about the recipes. There are several social networks providing a forum for themes related to cooking. Some social networks provide recipes, which may be directly or indirectly integrated into the application software ("APP") or a corresponding data base.

According to another embodiment, the application software ("APP") comprises a parameter display function for indicating information about the oven parameters. In particular, the parameter display function indicates the current way of heating, the current temperature, the elapsed time, and the remaining time. Further, the parameter display function may provide indications for necessary activities of the cooking process. Preferably, a warning before the end of the cooking duration may be indicated, for example ten minutes before the end of the cooking time. Furthermore, a warning may be indicated in order to turn-over the food stuff 11, for example roast or poultry, by the user. Also, a warning for filling up a water tank for a steam cooker may be indicated.

According to a further embodiment, the application software ("APP") comprises a multi-timer function. Said multi-timer function is applicable to a cooking process, wherein different dishes and/or courses are prepared simultaneously at the same temperature, in particular in the same oven cavity 15 of the cooking oven 14. The different dishes and/or courses are cooked at the same temperature, but with diverse cooking durations. The cooking process is performed at relative low temperatures. The multi-timer function of the application software provides a separate timer for each dish or course. For example, the user may adjust the timer directly for the single dishes and/or courses. Then, the elapsed times and/or remaining times are indicated. Optionally, a warning signal is indicated before the end of the cooking duration. If the different dishes and/or courses shall be finished at the same time, then they have to be inserted into the oven cavity 15 at different times. In this case, a warning signal may be indicated at the points in time, when the single dishes and/or courses should be inserted into the oven cavity 15.

Figure 5:
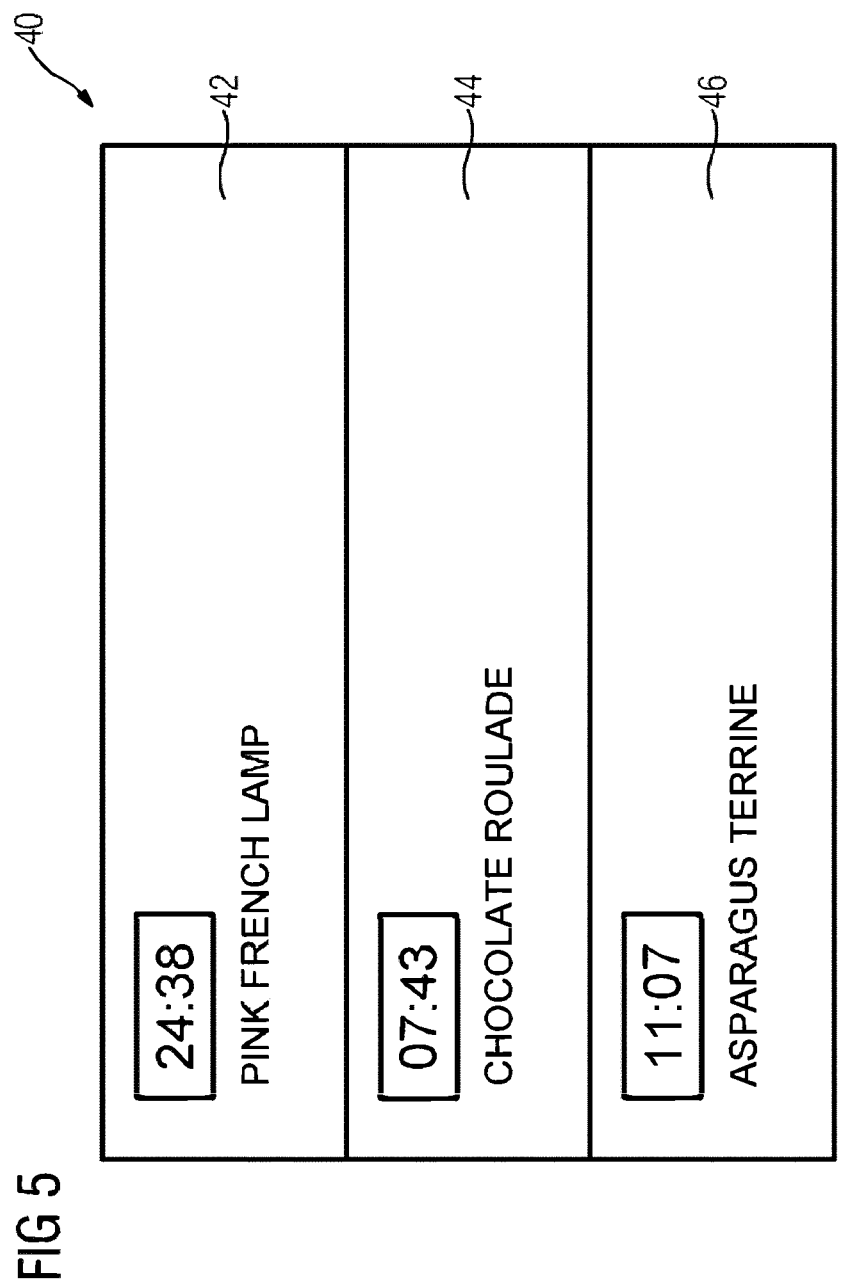
FIG. 5 illustrates a schematic view of an example for a page of a multi-timer function of the application software ("APP") for the mobile computer device according to the preferred embodiment of the present invention.

FIG. 5 illustrates a schematic view of an example for a page 40 of the multi-timer function of the application software ("APP") for the mobile computer device 12 according to the preferred embodiment of the present invention. The page of the multi-timer function may be represented by the display 18 or touch screen 18 of the mobile computer device 12. In this example, the page 40 of the multi-timer function indicates remaining cooking times for three different dishes and/or courses prepared in the same oven cavity 15 at the same temperature. The area of the page 40 is subdivided into three subareas 42, 44 and 46. Each subarea 42, 44 and 46 indicates the remaining cooking time and the name of the corresponding dish or course. In this example, a first subarea 42 indicates the dish "Pink French Lamb" and its remaining cooking time, a second subarea 44 indicates the dish "Chocolate Roulade" and its remaining cooking time, and a third subarea 46 indicates the course "Asparagus Terrine" and its remaining cooking time.

Figure 6:
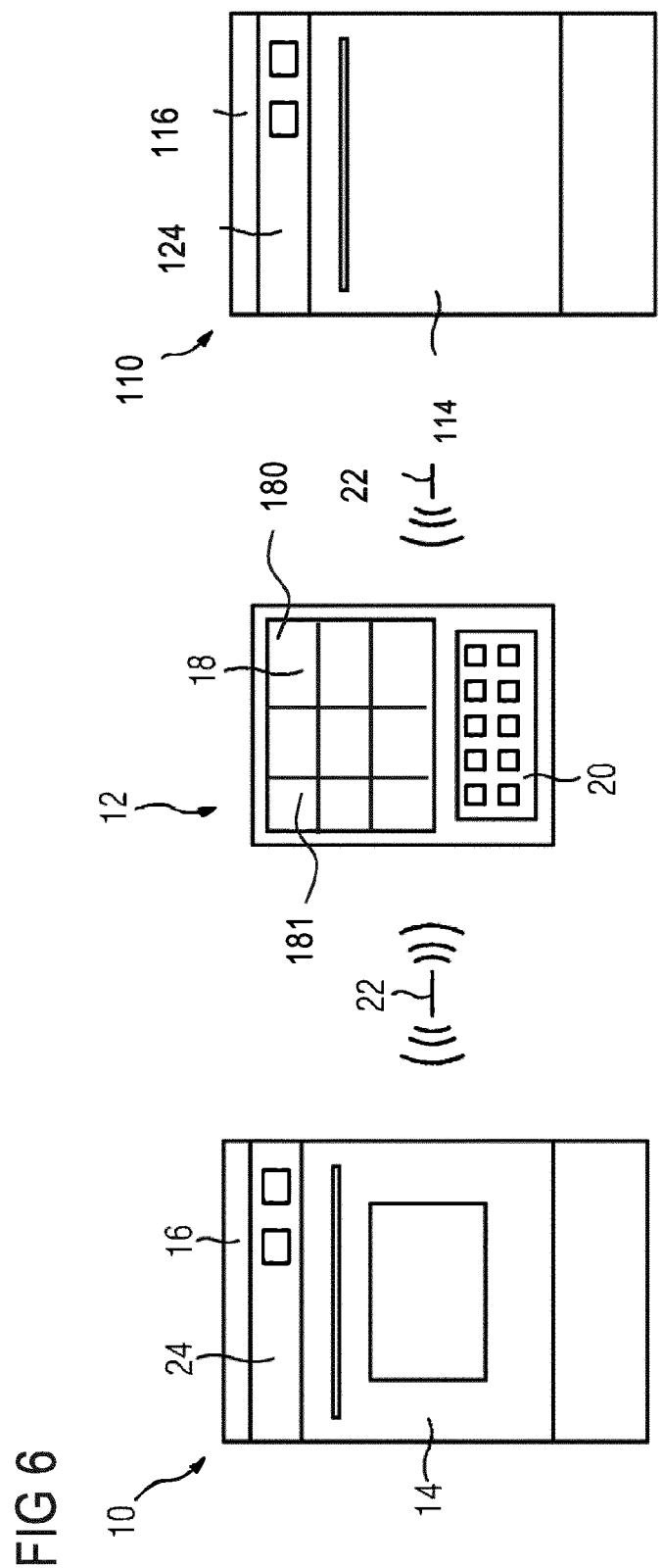
FIG. 6 illustrates a schematic view of an example for two domestic appliances and a mobile computer device according to a preferred embodiment of the present invention.

FIG. 6 illustrates a schematic view of an example for two domestic appliances 10, 110 and a mobile computer device 12 according to the present invention.

The mobile computer device 12 can be switched into a first connection state with the domestic appliance 10. In the first connection state, wireless data connection is enabled by the domestic appliance 10 and the mobile computer device 12.

In the first connection state, remote control and/or monitoring is enabled by the domestic appliance 10 and the mobile computer device 12, so that in the first connection state parameters and/or functions of the domestic appliance 10, especially oven functions, can be monitored and/or controlled on the mobile computer device 12.

The mobile computer device 12 can be switched into a second connection state with the domestic appliance 10. In the second connection state, no parameters and/or functions of the domestic appliance 10, especially no oven functions, can be monitored and/or controlled.

In the second connection state, remote control is disabled by the domestic appliance 10 and/or the mobile computer device 12. In the second connection state, also the wireless data connection 22, especially the WiFi connection, is disabled by the domestic appliance 10 and/or the mobile computer device 12.

The mobile computer device 12 is interconnected or interconnectable in FIG. 6 via a wireless data connection with a first domestic appliance 10 and a second domestic appliance 110.

The second domestic appliance 110 comprises a cooking oven 114, a stationary control unit 124 as well as a cooking hob 116.

The first domestic appliance 10 and the second domestic appliance 110 are of the same appliance category or of different appliance categories. The appliance categories include ovens, cooktops and washing machines. In this embodiment, the first domestic appliance 10 and the second domestic appliance 110 are ovens.

The mobile computer device 12 is in a first appliance connection mode in the first connection state only with the first domestic appliance 10. The mobile computer device 12 is in the first appliance connection mode in the second connection state with the second domestic appliance 110.

The mobile computer device 12 is in a second appliance connection mode in the first connection state only with the second domestic appliance 110. The mobile computer device 12 is in the second appliance connection mode in the second connection state with the first domestic appliance 10.

The mobile computer device 12 is switchable between the first appliance connection mode and the second appliance connection mode.

When the mobile computer device 12 switches between appliance connection modes, it is getting configuration data from the domestic appliance 10 or 110 which is switched into the first connection state, wherein the configuration data is saved in the memory unit of the mobile computer device 12.

FIG. 7 illustrates a schematic view of an example for a domestic appliance 10 and two mobile computer devices 12 and 212 according to the present invention. The mobile computer devices 212 comprises a keyboard 220.

The first mobile computer device 12 and the second mobile computer device 212 are interconnected or interconnectable via a wireless data connection with the domestic appliance 10.

In a first device connection mode only the first mobile computer device 12 is in the first connection state with the domestic appliance 10. Furthermore, in the first device connection mode, the second mobile computer device 212 is in the second connection state with the domestic appliance 10.

In the second device connection mode, the first mobile computer device 12 is in the second connection state with the domestic appliance 10. Furthermore, in the second device connection mode only the second mobile computer device 212 is in the first connection state with the domestic appliance 10.

The domestic appliance 10 is switchable between first device connection mode and the second device connection mode.

The mobile computer device 12 comprises a display presenting a display area 180, wherein the display area is splitted into rectangular display regions 181, especially into rectangular app tiles, as can be seen from FIG. 6.

Each display region 181 comprises a container for displaying data. The mobile computer device 12 receives configuration data from the domestic appliance 10. The size and the position of the display regions as well as the data to be displayed in the containers can be adapted based on the configuration data.

The configuration data is determined by the domestic appliance 10 and/or the behaviour of the user of the domestic appliance 10.

According to another embodiment, the application software ("APP") comprises an "intuitive display function" for indicating the status of the cooking process. For example, in the beginning of the cooking process the background of the display 18 or touch screen 18 or an indicating portion of said display 18 or touch screen 18 is dark. Then a relatively small bright area on the display 18 or touch screen 18 or the indicating portion of said display 18 or touch screen 18, respectively, is activated. During the advancing cooking process, the bright area becomes bigger. In the end of the cooking process the whole area of the display 18 or touch screen 18 or of the indicating portion of said display 18 or touch screen 18, respectively, becomes bright. Preferably, the bright area is enhanced from left to right. In particular, a characteristic colour for the area becoming brighter is used. The "intuitive display function" allows that the status of the cooking process may be recognized clearly and from a relatively big distance.

According to a further embodiment, the application software ("APP") comprises a cooking time reduction function and/or a temperature reduction function. In this case, said cooking time reduction function and temperature reduction function require the bidirectional wireless connection 22 between the cooking appliance 10 and the mobile computer device 12, so that the cooking appliance 10 is controllable by the mobile computer device 12. The user may reduce the cooking time and/or the temperature wirelessly via the mobile computer device 12. There is no doubt about the safety since the energy supply is reduced. In contrast, there is doubt about the safety, if the cooking time and/or the temperature increase, since very high electric power is operated by remote control.

According to another embodiment, the application software ("APP") comprises a cooking time adjusting function and/or a temperature adjusting function, wherein an increasing of the cooking time and/or the temperature is allowed. For safety reasons the cooking time and/or the temperature may be increased by a slider, which can be activated only by two fingers at the same time. This reduces the danger of an inadvertent activation of said slider.

According to a further embodiment, the application software ("APP") comprises a display function of statistic parameters. For example, the energy consumption of the cooking appliance may be indicated in relation to other parameters. The energy consumption for predetermined time periods may be indicated graphically or by a table. The energy consumption may be indicated in dependence of the types of food stuff 11 of recipes.

According to another embodiment, the application software ("APP") comprises an edit function. The user may input and store an own cooking recipe for his own purposes. Further, the user may present own cooking recipes in a social network, wherein photographs of the user and/or food stuff 11 may be inserted.

What is claimed is:

1. A mobile device configured to communicate with at least one smart appliance, the mobile device comprising:
at least one sensing element configured to detect a current value of an operational feature of the at least one smart appliance;
a memory with a table of data comprising stored values of operational features of the smart appliance in relation to at least one of a current value, a food, a safe operation of the operational feature, and a food pairing;
a transceiver configured to selectively receive at the mobile device data from the smart appliance in a first communication state, and receive data from and transmit data to the smart appliance via the mobile device in a second communication state;
a processor arranged in communication with the at least one sensing element, the memory and the transceiver, the processor configured to:
receive the current value from the at least one sensing element;
determine whether the current value of an operational feature matches the stored value of the operational feature;
generate instruction for the smart appliance to execute in order to adjust the current value to match the stored value when the current value does not match the stored value; and
wherein the transceiver is further configured to communicate the instruction to the smart appliance when the transceiver is in the second communication state.

2. The mobile device according to claim 1, wherein the processor is further configured to determine whether successive current values match successive stored values.

3. The mobile device according to claim 1, further comprising: a user interface arranged in communication with the processor, the user interface comprising manual input output means configured to receive manual instruction and a display configured to graphically display information.

4. The mobile device according to claim 1, wherein the at least one smart appliance comprises two smart appliances, both of which are in simultaneous communication with the mobile device.

5. The mobile device according to claim 2, wherein the operational feature comprises at least one of: an operating mode of the smart appliance, including operating temperature of the smart appliance, temperature setting of the smart appliance, and smart appliance setting; and at least one duration of an operation corresponding to a food preparation duration.

6. The mobile device according to claim 5, wherein the stored value comprises at least one of a smart appliance operation mode, safe temperature operating level of the smart appliance and a safe duration of operation of the smart appliance.

7. The mobile device according to claim 6, wherein
the processor is further configured to determine whether the current value exceeds at least one of the safe temperature operating level of the smart appliance and a safe duration of operation of the smart appliance; and
the instruction comprises smart appliance instructions to lower the current value when the current value exceeds at least one of the safe temperature operating level of the smart appliance and a safe duration of operation of the smart appliance; and
wherein the instructions are automatically communicated to the smart appliance when it is determined that the current value exceeds the at least one of the safe temperature operating level of the smart appliance and a safe duration of operation of the smart appliance.

8. A mobile device configured to communicate with at least one smart appliance, the mobile device comprising:
at least one sensing element configured to detect a current value of an operational feature of the at least one smart appliance;
a memory with a table of data comprising stored values of operational features of the smart appliance in relation to at least one of a current value, a food, a safe operation of the operational feature, and a food pairing;
communication means configured to selectively receive at the mobile device data from the smart appliance in a first communication state, and receive data from and transmit data to the smart appliance via the mobile device in a second communication state;
processing means arranged in communication with the at least one sensing element, the memory and the communication means, the processing means configured to:
receive the current value from the at least one sensing element;
determine whether the current value of an operational feature matches the stored value of the operational feature; and
generate instruction for the smart appliance to execute in order to adjust the current value to match the stored value when the current value does not match the stored value;
wherein the communication means is further configured to communicate the instruction to the smart appliance when the communication means is in the second communication state;
wherein the smart appliance is an oven including a cooking cavity and a hob; and
wherein the sensing element comprises at least one camera configured and arranged to generate an image of at least one of the cooking cavity and the hob when the at least one of the cooking cavity and the hob is within the field of view of the camera.

9. The mobile device according to claim 8, wherein:
the processor is further configured to receive the image and determine from the image whether food is present and at least one type of food and an amount of food when it is determined that the food is present; and
the operational feature further comprises an indication of at least one of the type of food and amount of food.

10. The mobile device according to claim 8, wherein the image is a video image.

11. The mobile device according to claim 3, wherein the processor is further configured to:

determine whether manual instruction was received at the manual input output means;

when it is determined that manual instructions were received, determine whether the instruction increases or decreases the current value; and automatically communicate the instruction to the smart appliance when the instruction does not increase the current value, and automatically not communicate the instruction when the instruction initiated at the manual input output means does increase the value.

12. The mobile device according to claim 11, wherein the user interface is further configured to generate a graphical image on the display, the graphical image comprising at least one: of a sliding scale configured to enable manual input of information into the manual input output means; and a menu configured to enable manual input of information regarding function selection, the menu comprising linking means for bringing up further menus related to food recipes, social feeds, smart appliance controls and smart appliance manuals; and at least one duration of an ongoing cooking operation.

13. The mobile device according to claim 12, wherein the at least one duration of ongoing cooking operation comprises at least three separate durations of ongoing cooking operations.

14. The mobile device according to claim 12, wherein graphical representation of the at least one duration of ongoing cooking operation comprises a bar graph with increasing illumination in proportion to lapsed duration.

15. The mobile device according to claim 12, wherein at least one of the graphical image and manual input output means is configured to operate upon detection of at least two fingers simultaneously engaging the user interface.

16. A non-transitory computer readable medium for communicating with at least one smart appliance with a mobile device when the configured to communicate with at least one smart appliance, comprising instructions stored thereon, that when executed on a processor, perform the steps of:

configuring at least one sensing element to detect a current value of an operational feature of the smart appliance;

accessing a table of data stored in a memory, the table of data comprising stored values of operational features of the smart appliance in relation to at least one of a current value, a food recipe, a safe operation of the operational feature, and a food pairing;

selectively communicating so as to selectively receive at the mobile device data from the smart appliance in a first communication state, and receive data from and transmit data to the smart appliance via the mobile device in a second communication state;

receiving the current value from the at least one sensing element;

determining whether the current value matches the stored value;

generating instruction for the smart appliance to execute in order to adjust the current value to match the stored value when the current value does not match the stored value; and communicating the instruction to the smart appliance.

* * * * *